UNITED STATES PATENT OFFICE.

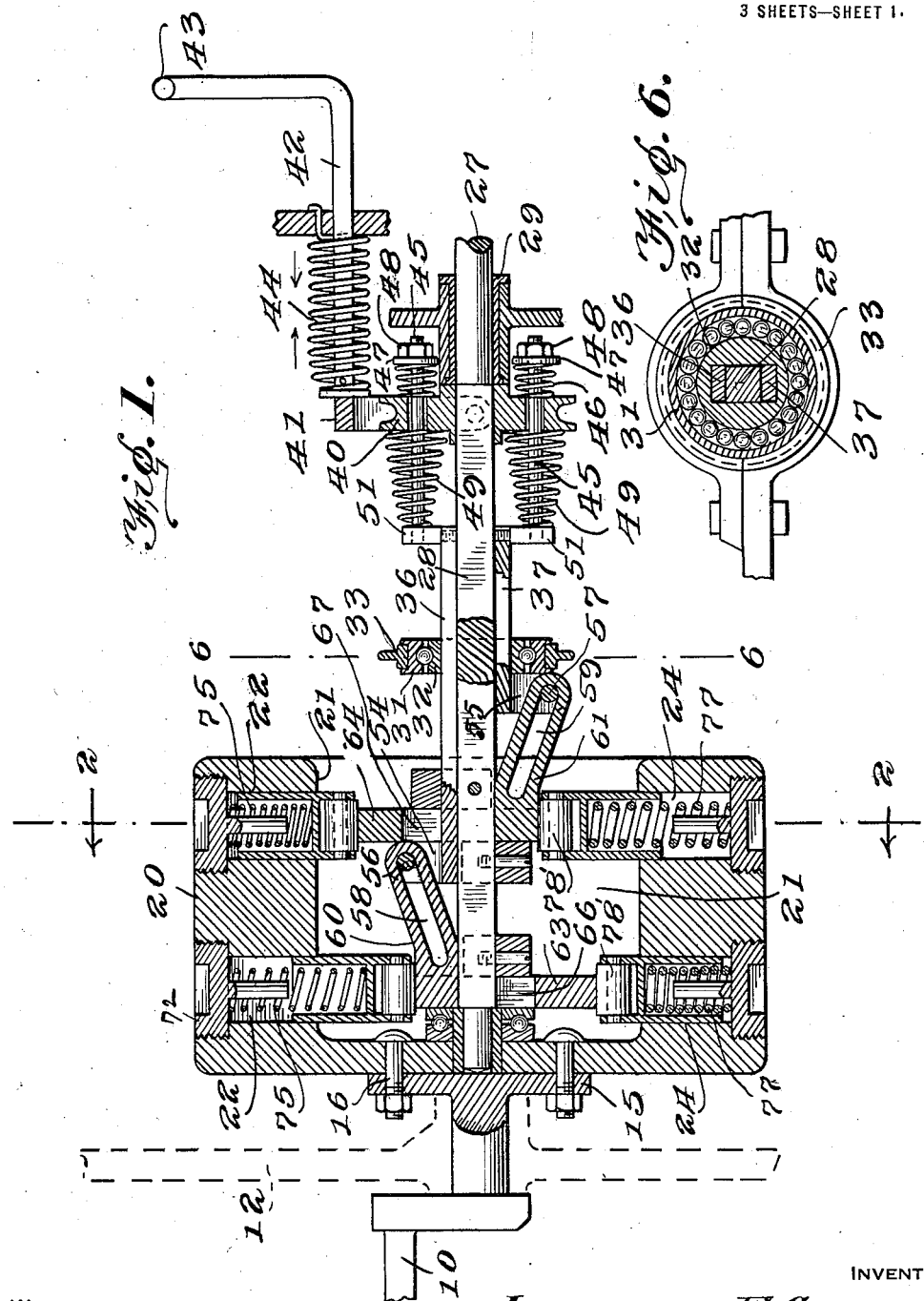

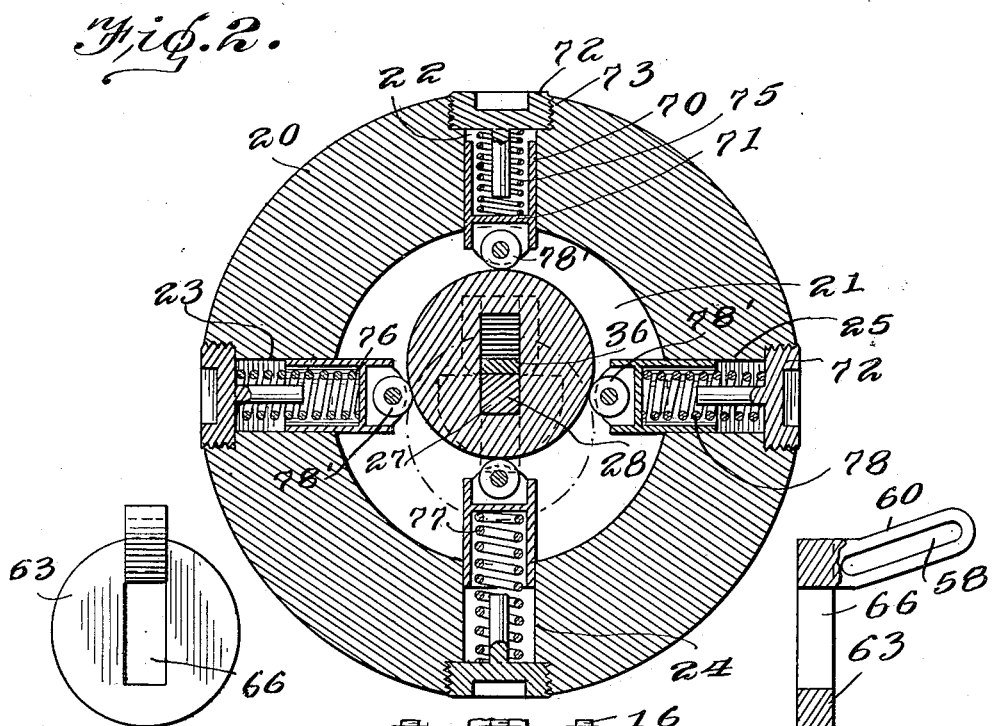
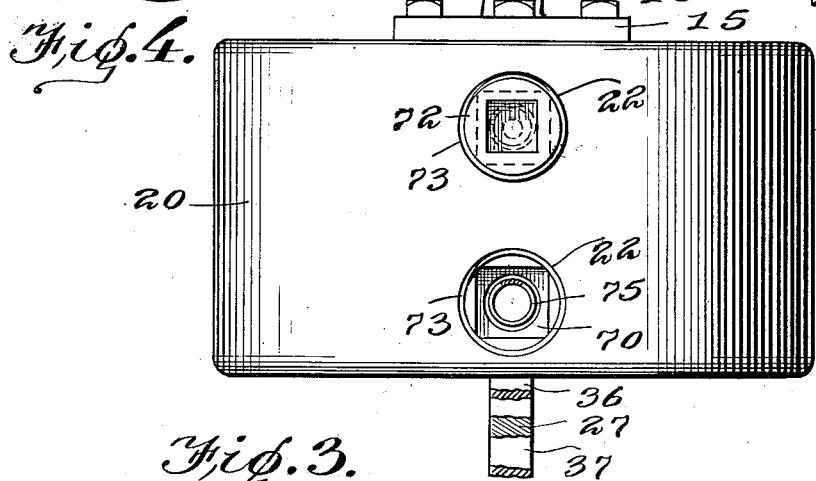

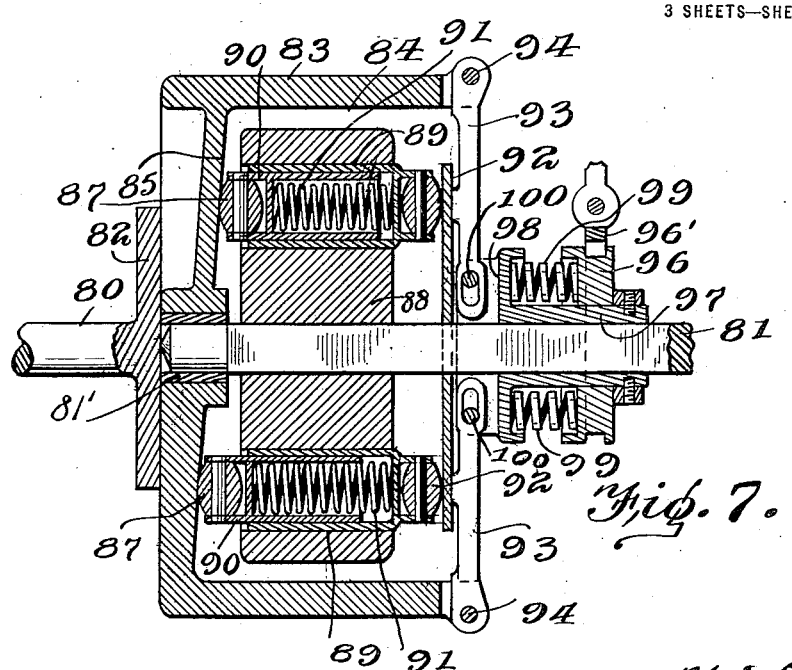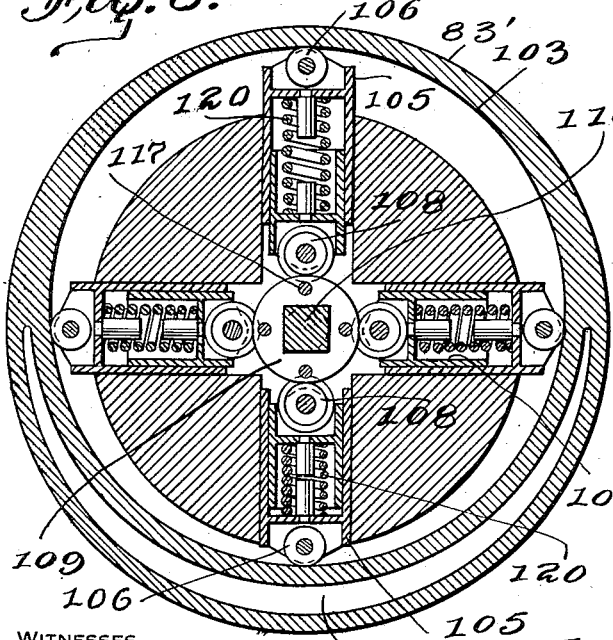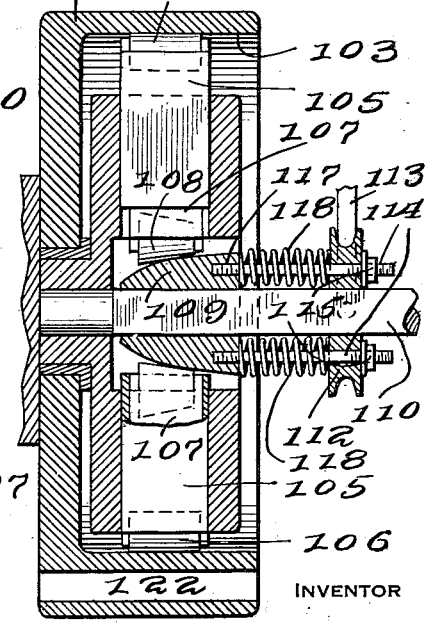

LAWRENCE E. CONNER, OF JACKSON, MICHIGAN.

TRANSMISSION MECHANISM FOR AUTOMOBILES.

1,297,105. Specification of Letters Patent. Patented Mar. 11, 1919.

Application filed April 10, 1917. Serial No. 161,035.

*To all whom it may concern:*

Be it known that I, LAWRENCE E. CONNER, a citizen of the United States, residing at Jackson, in the county of Jackson and State of Michigan, have invented new and useful Improvements in Transmission Mechanism for Automobiles, of which the following is a specification.

This invention relates to transmission mechanism for automobiles and the like, and one of the objects of the invention is to provide a structure in which the coacting element shall be brought into full operation gradually, as distinguished from one in which the full engagement is immediately effective, and further to provide for attaining this object regardless of the fact that the actuating elements controlling the position of the transmission members may be thrown into operative position by a sudden or positive movement of such actuating elements.

A further object is to provide a construction in which there is an entire absence of members which will be damaged by heat due to excessive friction.

A still further object is to provide for securing engagement between the coöperating elements by means of the manipulation of members adapted to be thrown to an eccentric position with reference to a plurality of devices held resiliently under different degrees of compression, the maximum compression being sufficient to produce positive contact and causing those elements which are first in partial coöperation to fully coöperate and transmit the maximum speed imparted to the driving shaft.

With the foregoing and other objects in view, the invention consists in the novel construction, combination and arrangement of elements hereinafter described and claimed:

In the accompanying drawings, forming part of this application:—

Figure 1 is a vertical longitudinal section.

Fig. 2 is a section on the line 2—2 of Fig. 1.

Fig. 3 is a top plan view of the structure shown in Fig. 2.

Figs. 4 and 5 are detail views showing a disk carrying a laterally extending arm adapted to be thrown into eccentric position with reference to the main shaft.

Fig. 6 is a section on the line 6—6 of Fig. 1 and showing means for supporting the main shaft and certain reciprocating members carried thereby.

Fig. 7 is a vertical longitudinal section showing a modified form.

Fig. 8 is a view partly in vertical transverse section showing a further modification.

Fig. 9 is a vertical longitudinal section of the structure shown in Fig. 8.

Referring to Fig. 1, the crank shaft of the engine is designated 10 and a portion of the casing for the transmission mechanism is shown at 12, it being the intention that this casing shall extend entirely around the operative elements and inclose the latter in an oil bath.

Shaft 10 is provided with a flange member 15 which is secured by bolts 16 to a rotating and driving member or fly wheel designated as a whole by 20, this member having an internal recess 21 and being provided with a plurality of radially extending bores 22, 23, 24 and 25 for the accommodation of radially extending devices resiliently mounted and adapted to carry rollers on their inner ends for contacting with disks eccentrically or concentrically mounted with reference to the main shaft.

The driven shaft is designated 27 and is provided with a portion cylindrical in cross section and with a square portion 28, said shaft 27 being mounted within a bearing 29. The shaft is supported at an intermediate point by means of a bearing shown in detail in Fig. 6 and including raceways 31 and 32 mounted within a frame 33, the inner race member 32 comprising a disk having an elongated slot therein through which the square shaft 28 passes and through which the longitudinally movable members 36 and 37 also pass. Members 36 and 37 are movable lengthwise of the shaft by means of mechanism described below, and control a plurality of disks adapted to be thrown into eccentric position in the operation of the device.

A collar 40 is provided with a circumferential groove adapted to be engaged by member 41 carried by a reciprocating bar 42 mounted on the frame for the purpose of sliding said collar and actuating the slidable bars 36 and 37. Said bar 42 is operated through the medium of a foot lever 43, and a retractile spring 44, and serves to hold the elements in the position shown in Fig. 1. Collar 40 is provided with apertures through which pins 45 pass, one end of each pin carrying a coiled spring 46, a washer 47 and a nut 48, and the opposite end of each pin being encircled by a coiled spring 49 abutting against one side of collar 40 and against an arm 51 carried by one of the bars 36 or 37. These bars last named are each controlled through a similar series of connections with collar 40.

On the opposite end of bar 36 is an upwardly extending member 54 and on the corresponding end of bar 37 is a similar member 55, these members being provided with apertures through which pins 56 and 57 pass, said pins engaging respectively slots 58 and 59 in arms 60 and 61 projecting laterally from disks or collars 63 and 64. These collars are shown in detail in Figs. 4 and 5, Fig. 4 showing a face view and Fig. 5 a view in vertical section with the slotted arm in elevation. Disk 63 is provided with a slot 66 and disk 64 with a slot 67 of rectangular formation and designed to accommodate the square shaft 28 and to permit of the movement of said disks to a position eccentric with reference to said shaft. In Fig. 1 the disks are shown as being oppositely located with reference to each other, this being the engaging position when the elements are in full coöperation.

In Fig. 2 the devices for bearing against the edges of the eccentric disk are illustrated in detail, the view being on line 2—2 of Fig. 1, where this structure is also shown. The bores 22, 23, 24 and 25 are square in cross section and within each bore a square tubular member 70 is mounted and is capable of reciprocating action therein, member 70 having a circular bore for the accommodation of a coiled spring which bears against transverse member 71 and against head 72 having threaded connection with a bore 73. The spring shown in the upper portion of Fig. 1 and designated 75 is a comparatively light spring and the remaining springs 76, 77 and 78 are heavier springs. Each member 70 carries a roller 78' bearing against the eccentric disk.

In Fig. 1 two series of reciprocating devices 70 with their inclosed springs and anti-friction rollers are illustrated, the light and heavy springs having the relative position there shown. Fig. 3 shows two adjacent plugs or heads 72 which are threaded into the outer portion of the fly wheel, and this view also shows the reciprocating device 70 constituting a casing for the spring as having a rectangular or square cross section and being provided with a bore of cylindrical cross section. When the parts are in full coacting position for transmitting maximum speed as shown in Fig. 1 the disks are each eccentric with reference to the shaft but are oppositely located with reference thereto so that the square portion of the shaft passes through the slot in one disk near one end thereof and through the slot in the other disk near the other end thereof. The disks are alternately in full coöperation with the anti-friction rollers 70 carried by the heavier springs or the springs shown in the lower half of Fig. 2 and the maximum torque or twisting action is imparted when each disk is thus engaged. In view of the relative position of the disks, a substantially continuous torque will result during each rotation of the fly wheel.

When the collar 40 is first advanced longitudinally of the square shaft that reciprocating bar 36 or 37 which is obliged to act against the action of the heavier springs will be retarded and this movement will be compensated for in view of the coiled springs surrounding pins 45. During the further movement of the parts these reciprocating members 36 and 37 will be advanced gradually or in a step by step movement and will bring the parts in full engagement with a cushioned effect.

In Fig. 7 I have shown a modification of the construction in which the driving shaft is designated 80 the driven shaft 81, said driving shaft carrying a flange member 82 rigidly connected with a clutch member 83 having an internal bore 84, one wall of which, shown at 85, provides a cam surface against which the contacting or anti-friction rollers 87 are caused to bear during the rotation of said shaft 80. The shaft 81 carries a disk 88 provided with a plurality of bores extending therethrough in a direction parallel with the shaft and within each bore is mounted a tubular member 89 and a telescoping tubular member 90, said members being resiliently mounted with reference to each other by means of a coiled spring 91 passing through the inner bore of member 90. Said member 90 provides bearings for anti-friction roller 87 and member 89 provides bearings for anti-friction rollers 92 contacting with pivoted members or arms 93 which are mounted at 94. The desired degree of compression is secured by means of a collar 96 mounted to move longitudinally with reference to shaft 81 and mounted directly upon the tubular member or sleeve 97, one end of which is provided with a flange 98. Between flange 98 and collar 96 springs 99 are mounted. The longitudinal movement of collar 96 by means of the operating device 96', and the similar movement of sleeve 97, provide for the operation of the arms 93 which are pivotally secured by means of the pin and slot connection shown at 100.

In Figs. 8 and 9 a further form of the device is illustrated, in which a plurality of reciprocating members are mounted within a main clutch member. In this form the springs which retain the anti-friction rollers in contact with a central cone are of equal tension and the outer rollers bear against the walls of an eccentric bore 103 in the main clutch member. The principle of operation is substantially the same as in the two forms first described, but a plurality of contacting anti-frictional devices are employed in connection with each pair of reciprocating tubular members.

The outer tubular member of each pair is designated 105 and carries an anti-friction roller 106, the inner tubular member telescoping therewith being shown at 107 and carrying an anti-friction roller 108 bearing against cone 109 carried by the shaft 110. This cone member may be shifted longitudinally by means of a collar 112 operated by any suitable device 113. Pins 114 extend transversely through the collar and carry nuts 115 for retaining the same in position, these pins extending into the body of the cone at 117 and being encircled by coiled springs 118.

As already indicated, the coiled springs 120 extending radially from the shaft 110 and mounted within tubular members 107 are of equal tension. This also applies to the springs 91 in the form of the device illustrated in Fig. 7.

The fly wheel constituting a clutch member shown at 83' is provided with a slotted portion 122 for properly balancing the member 83. The end of shaft 81 is carried within a sleeve 81' carried by flanged portion 82.

I claim:—

1. In a transmission mechanism, a driving shaft, a fly wheel carried thereby, a driven shaft, a plurality of radially and resiliently mounted devices carried by the fly wheel, a plurality of disks on the driven shaft, and means for throwing the disks into an eccentric position with reference to said shaft last named, and into positions opposite to each other with reference to the longitudinal axis of the shaft, said resiliently mounted devices being under different degrees of compression.

2. In a transmission mechanism, a driving shaft, a fly wheel carried thereby, a driven shaft, a plurality of series of radially and resiliently mounted devices carried by the fly wheel and extending toward said driven shaft, anti-friction devices carried by the radially mounted devices, disks carried by the driven shaft, and adapted to be thrown from a concentric to an eccentric position, and positioned to alternately and positively engage those resiliently mounted devices in the respective series located on a given side of the shaft.

3. In a transmission mechanism, a driving shaft, a fly wheel carried thereby, a driven shaft, a plurality of reciprocable members carried by the driven shaft, a plurality of disks each of which is operated by one of said reciprocable members, said disks being capable of movement into eccentric positions on opposite sides of the driven shaft, a plurality of radially and resiliently mounted devices carried by the fly wheel, an anti-friction device carried by each of said radial devices and bearing against certain of said disks, the resilient members acting on the radially mounted devices having different degrees of resiliency under given compression.

4. In a transmission mechanism, a driving shaft, a fly wheel carried thereby, a driven shaft, a plurality of series of radially and resiliently mounted devices carried by the fly wheel, the individual resilient devices of a given series having different degrees of resiliency under given compression, anti-friction devices acting under the influence of the resilient devices, and a plurality of disks carried by the driven shaft and mounted to be thrown into eccentric position with reference thereto, and means for controlling the position of said disks.

5. In a transmission mechanism, a driving shaft, a driven shaft, a fly wheel carried by the driving shaft, a plurality of series of radially mounted resilient devices carried by the fly wheel, a plurality of disks carried by the driven shaft, means movable longitudinally of the shaft and mounted to force the disks into positions eccentric with the driving shaft but oppositely located with reference thereto, said disks coöperating with said resiliently mounted devices.

6. In a transmission mechanism, a driving shaft, a fly wheel carried thereby, a driven shaft, a plurality of series of tubular members mounted in bores extending radially from the outer portion of the fly wheel toward the central portion thereof, a plurality of resilient devices within the bores, anti-friction devices carried by the tubular members, said resilient devices having different degrees of elasticity under given compression, a plurality of disks carried by the driven shaft and adapted to engage the anti-friction devices, and means for controlling the position of the disks on said shaft and adapted to throw said disks from a concentric to an eccentric position.

7. In a transmission mechanism, a driving shaft, a fly wheel carried thereby, a driven shaft, a plurality of disks carried by the driven shaft and provided with rectangular slots, reciprocable means mounted longitudinally of the driven shaft and passing through said slots, an arm carried by each of said disks and extending at an angle thereto and with the shaft, means for connecting said arms with the reciprocable members for shifting the disks to an eccentric position, and a plurality of radially and resiliently mounted devices carried by the fly wheel and contacting with said disks, the resilient mounting of said devices being variable with reference to each other, permitting their free movement when the disks are in a concentric position, causing a gradual retarding movement upon shifting the disks, and then effecting the positive operation of the driven shaft at maximum speed.

8. In a transmission mechanism, a driving shaft, a driven shaft, a fly wheel carried by the driving shaft, a plurality of disks provided with elongated slots carried by the driven shaft and adapted to be thrown into eccentric position, means carried by the fly wheel and adapted to contact resiliently and then positively with the edges of the disks, and means controlling the position of said disks with reference to the axis of the shaft, said means including a slidable collar, means for operating said collar, a plurality of pins extending freely through the collar, springs located on opposite sides of the collar, and encircling said pins, reciprocable bars movable longitudinally of the shaft, each of said bars being operated by said collar through one of said pins, and means connecting said bars with the disks for shifting the latter.

9. In a transmission mechanism, a driving shaft, a driven shaft, a rotating member carried by the driving shaft, said rotating member being provided with radial channels having a rectangular cross section, tubular members of corresponding cross section operating within the channels, means for closing the outer ends of said channels, springs mounted within the tubular members and bearing against said means for closing the ends of the channels, anti-friction devices carried by the tubular members at their inner ends, a plurality of disks carried by the driving shaft and adapted to be thrown eccentrically with reference thereto, said anti-friction devices bearing against the edges of said disks.

10. In a transmission mechanism, a driving shaft, a fly wheel carried thereby, a driven shaft, a plurality of resiliently mounted radially extending members carried by the fly wheel, springs having varying degrees of resiliency for producing the resilient mounting of said radial devices, certain of said springs being positioned opposite other springs having a less degree of resiliency, disks carried by the driven shaft and adapted to be engaged by the resiliently mounted devices, means for throwing the disks to eccentric positions for causing certain of the springs to be engaged by the eccentric members permitting the initial operation of the driven shaft at a slow speed and certain of said springs will be engaged by the eccentric members thereafter for producing the full operation of the driven shaft at the maximum speed.

11. In a transmission mechanism, a driving shaft, a rotatable member carried thereby, a driven shaft, a member rotatable with the driven shaft, a plurality of tubular members, resilient devices of different degrees of compressibility under given pressure for holding the tubular members in position, anti-friction devices carried by said tubular members, a member providing a cam surface coöperating with said anti-friction devices, said resilient devices causing a gradual and then a positive engagement between said anti-friction devices and the cam surface for producing a rotary movement of the driven shaft at maximum speed.

In testimony whereof I affix my signature.

LAWRENCE E. CONNER.